(12) United States Patent
Fujikawa

(10) Patent No.: US 11,199,747 B2
(45) Date of Patent: Dec. 14, 2021

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/037,713

(22) Filed: Sep. 30, 2020

(65) Prior Publication Data

US 2021/0103167 A1 Apr. 8, 2021

(30) Foreign Application Priority Data

Oct. 8, 2019 (JP) .............................. JP2019-185028

(51) Int. Cl.
*G02F 1/1339* (2006.01)
*G02F 1/1341* (2006.01)
*H04N 9/31* (2006.01)
*G02F 1/1333* (2006.01)

(52) U.S. Cl.
CPC .......... *G02F 1/1339* (2013.01); *G02F 1/1341* (2013.01); *H04N 9/315* (2013.01); *G02F 1/133308* (2013.01); *G02F 1/133311* (2021.01); *G02F 1/133317* (2021.01)

(58) Field of Classification Search
CPC .................. G02F 1/1339; G02F 1/1341; G02F 1/133311; G02F 1/133317; G02F 1/133308; H04N 9/315
See application file for complete search history.

(56) References Cited

U.S. PATENT DOCUMENTS

2005/0077638 A1* 4/2005 Sekiguchi .......... B29D 11/0074
264/1.31
2007/0297710 A1* 12/2007 Suzuki ................. G02B 3/0012
385/8
2010/0149452 A1* 6/2010 Harada ................. G02F 1/1333
349/58

(Continued)

FOREIGN PATENT DOCUMENTS

JP 2004012934 1/2004
JP 2005173422 6/2005

(Continued)

*Primary Examiner* — Hoan C Nguyen
(74) *Attorney, Agent, or Firm* — JCIPRNET

(57) ABSTRACT

An electro-optical device includes an electro-optical panel in which a frame-shaped sealing member is provided between a first substrate and a second substrate, a third substrate facing the second substrate on a side opposite from the first substrate, and a bonding member that adheres the second substrate and the third substrate to each other. The bonding member is frame-shaped and a width thereof is narrower than a width of the sealing member. In plan view, the bonding member extends at a position closer to a pixel region than a center, in the width direction, of the sealing member. Therefore, an extending length of the bonding member can be shortened and a fixing area between the second substrate and the third substrate can be reduced, and thus, stress acting on the second substrate from the third substrate can be reduced.

12 Claims, 17 Drawing Sheets

(56) References Cited

U.S. PATENT DOCUMENTS

| | | | |
|---|---|---|---|
| 2010/0231821 A1* | 9/2010 | Tsuji | G02F 1/133308 349/58 |
| 2011/0211152 A1 | 9/2011 | Hirabayashi | |
| 2015/0002779 A1* | 1/2015 | Joten | G02F 1/133308 349/59 |
| 2016/0284446 A1 | 9/2016 | Fujikawa | |
| 2017/0031202 A1* | 2/2017 | Lee | B32B 7/00 |
| 2017/0231121 A1 | 8/2017 | Morton | |
| 2017/0309689 A1* | 10/2017 | Li | H01L 27/3244 |

FOREIGN PATENT DOCUMENTS

| | | |
|---|---|---|
| JP | 2006098683 | 4/2006 |
| JP | 2009186538 | 8/2009 |
| JP | 2011158823 | 8/2011 |
| JP | 2011180325 | 9/2011 |

* cited by examiner

ELECTRO-OPTICAL DEVICE AND ELECTRONIC APPARATUS

The present application is based on, and claims priority from JP Application Serial Number 2019-185028 filed Oct. 8, 2019, the disclosure of which is hereby incorporated by reference herein in its entirety.

BACKGROUND

1. Technical Field

The present disclosure relates to an electro-optical device in which a third substrate is bonded to an electro-optical panel in which a first substrate and a second substrate are adhered to each other by a sealing member, and to an electronic apparatus.

2. Related Art

An electro-optical device, such as a liquid crystal device, includes an electro-optical panel in which a first substrate and a second substrate are adhered to each other by a frame-shaped sealing member, and an electro-optical layer is provided on an inner side of the sealing member between the first substrate and the second substrate. Further, in the electro-optical device, a third substrate, such as a dust-proof glass, is sometimes adhered, using an adhesive, to a side of the second substrate opposite from the first substrate. In the electro-optical device having such a configuration, when the first substrate and the second substrate are fixed to a holding member using adhesive, there is a problem in that stress from the holding member causes the spacing between the first substrate and the second substrate to fluctuate, and display unevenness is generated. Here, a configuration is conceivable in which a third substrate is caused to be larger than a second substrate, and an end portion of the third substrate is fixed to a holding member (see JP-A-2011-180325).

On the other hand, a configuration is conceivable in which an adhesive that contains a gap material for causing a cooling fluid to flow is provided between a second substrate and a third substrate in a frame shape so as to have a wider width than a sealing member, and the second substrate and the third substrate are bonded together (JP-A-2004-12934).

In the technique described in JP-A-2011-180325, even when the third substrate is fixed to the holding member, the third substrate and the second substrate are firmly fixed over the entire surface of the substrates using the adhesive. As a result, stress from the holding member is transmitted to the second substrate via the third substrate and causes the second substrate to deform, and there is thus a risk that the spacing between a first substrate and the second substrate fluctuates. In other words, the problem of generating the display unevenness remains. Further, when the adhesive having the wider width than the sealing member is provided in the frame shape between the second substrate and the third substrate, as in the technique described in JP-A-2004-12934, since the sealing member has enhanced sealing properties to prevent leakage of the coolant material, the third substrate and the second substrate are firmly fixed by the adhesive, as a result.

SUMMARY

In order to solve the above-described problem, an electro-optical device according to an aspect of the present disclosure includes an electro-optical panel including a first substrate, a second substrate facing the first substrate, and a sealing member having a frame shape and provided between the first substrate and the second substrate, a third substrate adhered to one of the first substrate and the second substrate, and a bonding member having a frame shape and provided between the third substrate and the one of the substrates, the bonding member having a narrower width than the sealing member.

The electro-optical device according to the aspect of the present disclosure can be used in various types of electronic apparatus. When the electronic apparatus is a projection-type display device, the projection-type display device includes a light source unit configured to emit light to be supplied to the electro-optical device, and a projection optical system configured to project light modulated by the electro-optical device.

DESCRIPTION OF EXEMPLARY EMBODIMENTS

Figure 1:
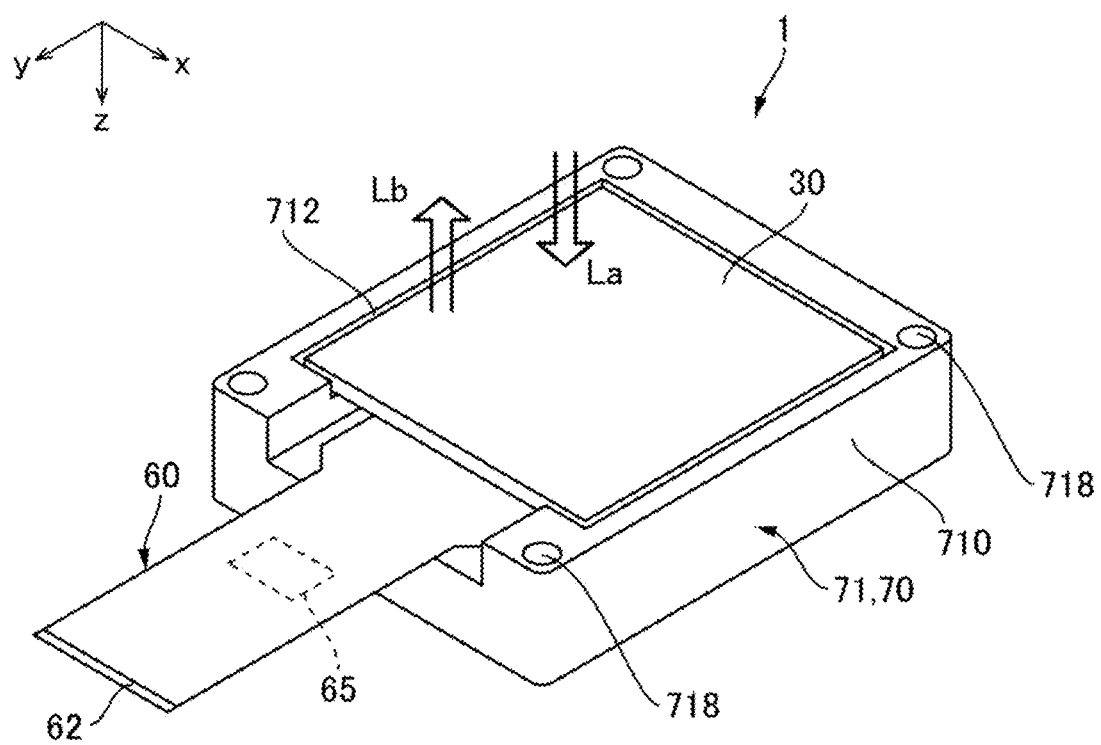
FIG. 1 is a perspective view schematically illustrating a mode of an electro-optical device to which the present disclosure is applied.

Embodiments of the disclosure will be described below with reference to the drawings. Note that, in each of the drawings to be referenced in the description below, to make members and the like recognizable in terms of size in the drawings, the members and the like are illustrated in different scales, and the number of the members is reduced. Below, each of directions is expressed using an orthogonal coordinate system consisting of an x-axis, a y-axis, and a z-axis. The z-axis direction is a thickness direction of an electro-optical device 1, the y-axis direction is an extending direction of a wiring substrate, and the x-axis direction is a width direction orthogonal to the extending direction of the wiring substrate.

Configuration of Electro-Optical Device 1
Basic Configuration

Figure 2:
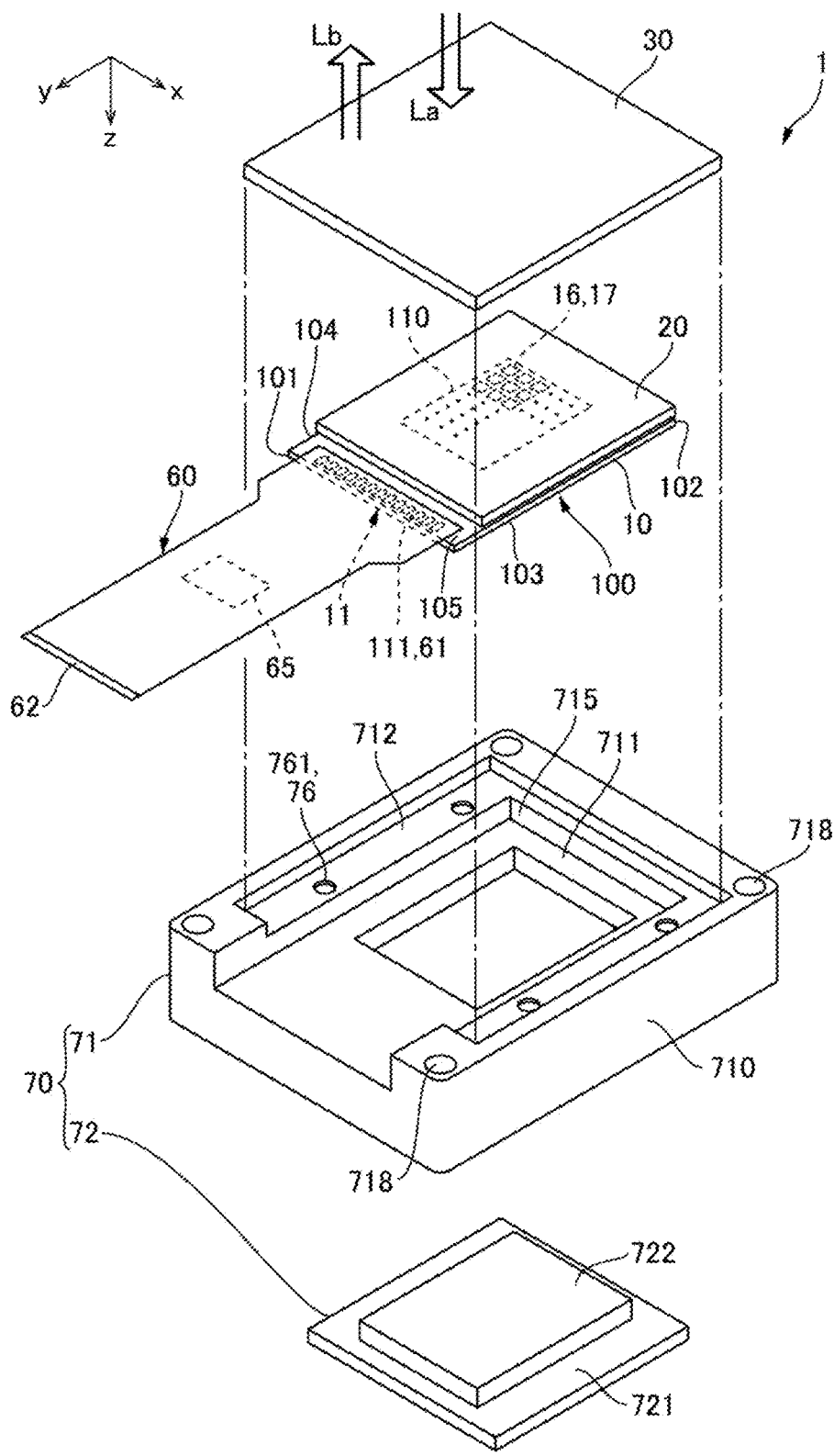
FIG. 2 is an explanatory diagram schematically illustrating a state in which the electro-optical device illustrated in FIG. 1 is disassembled.
Figure 3:
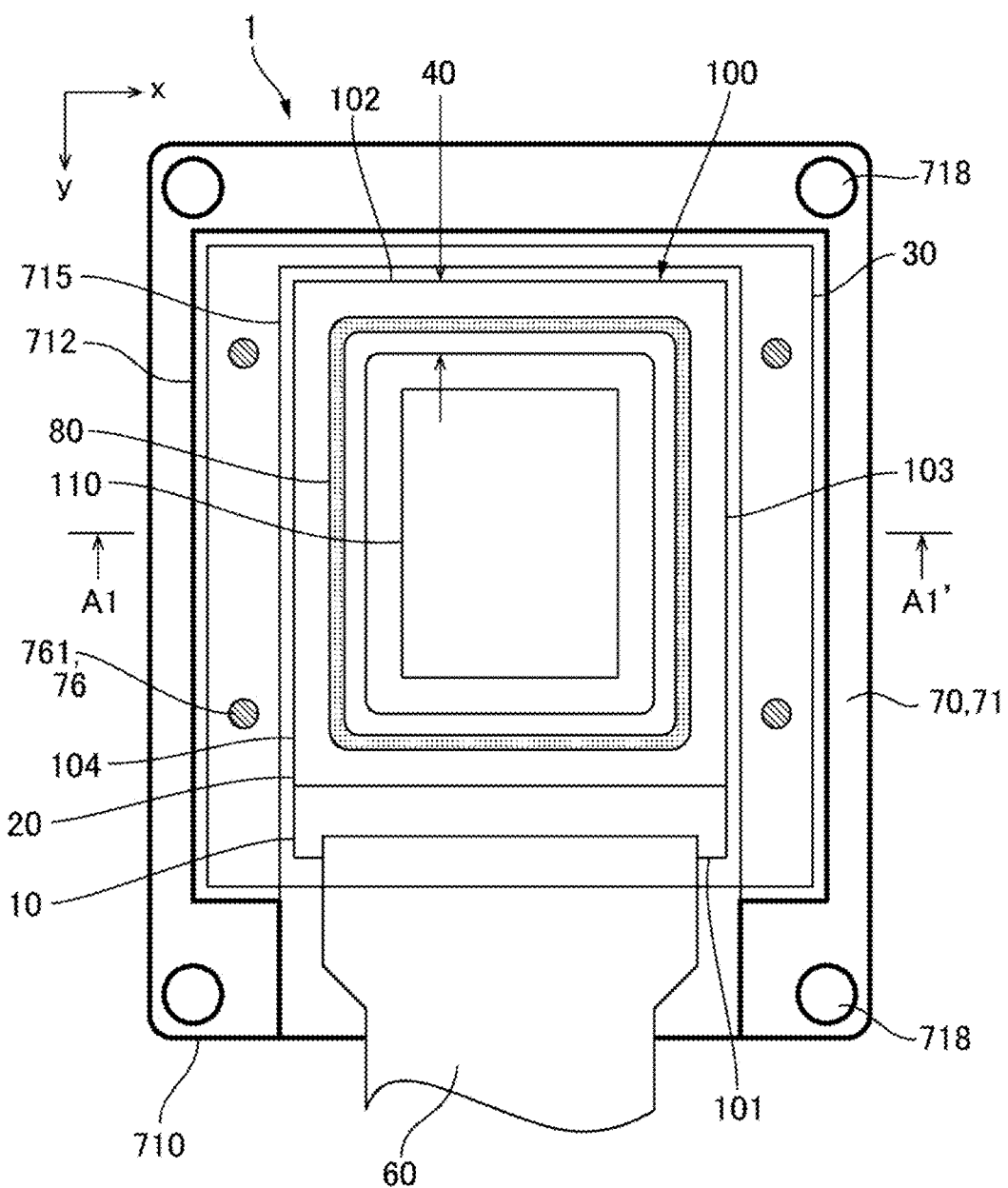
FIG. 3 is an explanatory diagram schematically illustrating a planar configuration of the electro-optical device illustrated in FIG. 1.
Figure 4:
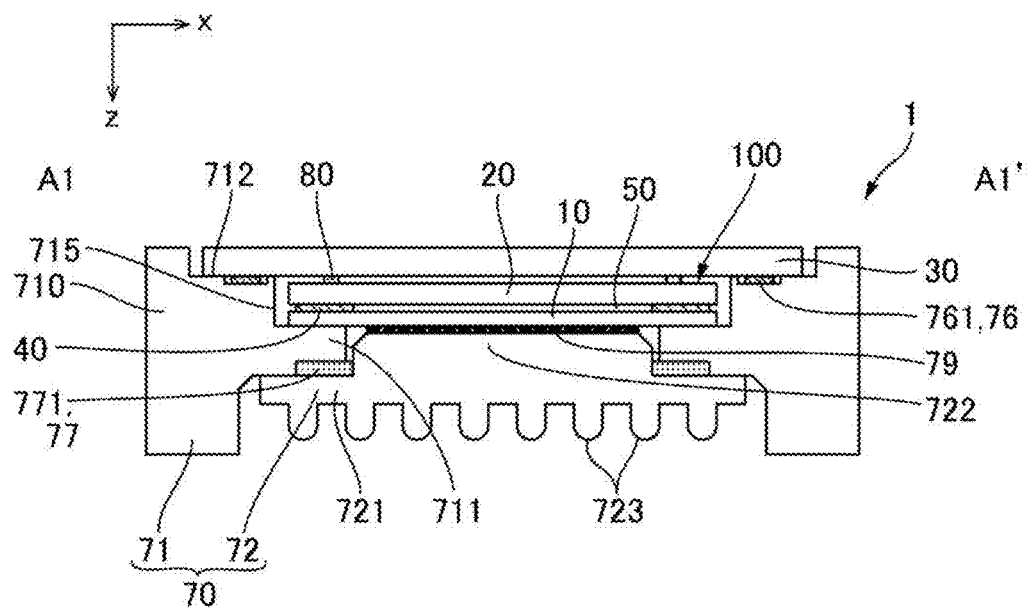
FIG. 4 is an explanatory diagram schematically illustrating a cross-section A1-A1' of the electro-optical device illustrated in FIG. 1.

FIG. 1 is a perspective view schematically illustrating a mode of the electro-optical device 1 to which the present disclosure is applied. FIG. 2 is an explanatory diagram schematically illustrating a state in which the electro-optical device 1 illustrated in FIG. 1 is disassembled. FIG. 3 is an explanatory diagram schematically illustrating a planar configuration of the electro-optical device 1 illustrated in FIG. 1. FIG. 4 is an explanatory diagram schematically illustrating a cross-section A1-A1' of the electro-optical device 1 illustrated in FIG. 1. Note that in FIG. 4, pixel electrodes 16, a common electrode, and the like are omitted.

In FIG. 1, FIG. 2, FIG. 3, and FIG. 4, the electro-optical device 1 is a liquid crystal device used as a light valve or the like to be described below, and is provided with a liquid crystal panel as an electro-optical panel 100. The liquid crystal panel 100 includes a first substrate 10, a second substrate 20 facing the first substrate 10, a sealing member 40 provided between the first substrate 10 and the second substrate 20, and the first substrate 10 and the second substrate 20 are adhered to each other by the sealing member 40. The sealing member 40 contains a gap material that controls a spacing between the first substrate 10 and the second substrate 20. Further, the sealing member 40 is typically formed in a frame shape along an outer peripheral portion of the second substrate 20, while avoiding an electrical connection portion (not illustrated) with a common electrode provided on the second substrate 20. This point is illustrated in a simplified manner in FIG. 3, FIG. 8, FIG. 9, FIG. 10, FIG. 12, and FIG. 16. An electro-optical layer 50 that is formed by a liquid crystal layer is provided in a region surrounded by the sealing member 40, between the first substrate 10 and the second substrate 20. A substrate main body of the first substrate 10 and a substrate main body of the second substrate 20 are formed by a light-transmitting substrate, such as heat-resistant glass, a quartz substrate, or the like.

A plurality of the pixel electrodes 16 are provided on the first substrate 10, and the common electrode is provided on the second substrate 20. Each of the plurality of pixel electrodes 16 configures a pixel 17, by facing the common electrode via the electro-optical layer 50. In the electro-optical device 1, a region in which the pixel electrodes 16 (pixels 17) are arranged in the x-axis direction and the y-axis direction is a pixel region 110, and a display region is configured by all or a portion of the pixel region 110.

The electro-optical device 1 of the present embodiment is a reflection-type liquid crystal device. More specifically, the pixel electrodes 16 provided on the first substrate 10 are formed by a reflective metal, such as aluminum or an aluminum alloy, while the common electrode is formed by a light-transmitting conductive film, such as ITO. Thus, illumination light (indicated by an arrow La) incident from the second substrate 20 side is modulated in the course of being reflected on the first substrate 10 side and emitted from the second substrate 20 side, and is emitted as modulated light (indicated by an arrow Lb).

The first substrate 10 includes a protruding portion 105 protruding in the y-axis direction from an end portion of the second substrate 20. The protruding portion 105 is provided with a terminal region 11 in which a plurality of terminals 111 are arranged at a predetermined pitch along a first side 101 that extends in a width direction (the x-axis direction) of the first substrate 10. The electro-optical device 1 includes a flexible wiring substrate 60 connected to the terminal region 11, and the wiring substrate 60 extends in the y-axis direction so as to separate from the first substrate 10. The wiring substrate 60 has electrodes 61 connected to the terminals 111 via an anisotropic conductive film or the like at the end portion on the first substrate 10 side, while a terminal 62, such as a board-to-board connector, is formed on the end portion on the side opposite to the side connected to the first substrate 10. Further, a driver integrated circuit (IC) 65 is mounted on the wiring substrate 60 at an intermediate position in the extending direction.

In the first substrate 10, a data line drive circuit (not illustrated) is provided between the terminal region 11 and the pixel region 110. The data line drive circuit supplies image signals to the plurality of pixel electrodes 16 illustrated in FIG. 2, via data lines (not illustrated) and pixel switching elements (not illustrated). Further, in the first substrate 110, an inspection circuit (not illustrated) may also be provided between a second side 102, which is opposite from the first side 101, and the pixel region 110. In the first substrate 10, a scanning line drive circuit (not illustrated) is provided in at least one position, of a position between the pixel region 110 and a third side 103, which extends in the y-axis direction from one end of the first side 101, and a position between the pixel region 110 and a fourth side 104, which extends in the y-axis direction from the other end of the first side 101. The scanning line drive circuit supplies a scanning signal to the pixel switching element via a scanning line (not illustrated).

The electro-optical device 1 includes a third substrate 30 on one of the first substrate 10 and the second substrate 20, so as to face the other of the substrates from a side opposite from the other substrate. The third substrate 30 is adhered to the one of the substrates by a bonding member 80 to be described later. The third substrate 30 is transmissive, and prevents foreign matter, such as dust, from directly attaching to the electro-optical panel 100, thus preventing foreign matter from being reflected in an image. In the present embodiment, the third substrate 30 is adhered, by the bonding member 80, to a surface of the second substrate 20 on the opposite side from the first substrate 10. The third substrate 30 is larger in size than the second substrate 20, and the third substrate 30 protrudes from all ends of the second substrate 20.

Configuration of Holding Member 70

The electro-optical device 1 includes a holding member 70 that supports the electro-optical panel 100 from both sides in the thickness direction (the z direction). The holding member 70 includes a metal first holding member 71 that surrounds the periphery of the electro-optical panel 100, and a metal second holding member 72 made of metal that supports the electro-optical panel 100 from the side of the first substrate 10.

The first holding member 71 includes a frame portion 710 surrounding the periphery of the electro-optical panel 100. A first housing portion 715 formed of a recessed portion, in which the electro-optical panel 100 is housed, is provided in the frame portion 710. A support plate portion 711 that comes into contact with the first substrate 10 and supports the electro-optical panel 100 is provided on a bottom portion of the first housing portion 715. Further, a second housing portion 712 formed of a recessed portion, in which the third substrate 30 is housed, is provided in the frame portion 710. In the present embodiment, since the third substrate 30 has a larger planar size than the electro-optical panel 100, the second housing portion 712 is provided further to the outside than the first housing portion 715. In the present embodiment, the third substrate 30 is provided as far as the outside of the first housing section 715 in plan view.

A first fixing portion 76, which is formed by a hole in which an adhesive 761 for securing the third substrate 30 to the first holding member 71 is disposed, is provided on a bottom portion of the second housing portion 712. The first fixing portion 76 is provided, for example, in a total of 4 locations, namely, at two locations outside the third side 103 of the first substrate 10 and at two locations outside the fourth side 104 of the first substrate 10. Thus, the third substrate 30 is fixed to the first holding member 71 of the holding member 70 by the adhesive 761. The electro-optical panel 100 is not directly bonded to the holding member 70, and the electro-optical panel 100 is fixed to the first holding member 71 of the holding member 70 via the third substrate 30. Note that the four corners of the frame portion 710 are provided with holes 718 that fasten fixing bolts when the electro-optical device 1 is mounted on a display device.

The second holding member 72 includes a flat plate portion 721 and a protruding portion 722 that protrudes from the flat plate portion 721 toward the electro-optical panel 100. A fin 723 for heat dissipation is provided on a surface of the flat plate portion 721 on the opposite side from the electro-optical panel 100. The flat plate portion 721, and the support plate portion 711 of the first holding member 71 are fixed by a second fixing portion 77 using an adhesive 771. In this state, the protruding portion 722 faces the first substrate 10 of the electro-optical panel 100, and a grease 79 for thermal conduction is provided between the protruding portion 722 and the first substrate 10.

Configuration of Bonding Member 80

In the electro-optical device 1 according to the present embodiment, when the third substrate 30 is adhered to the bonding member 80, on the surface of the second substrate 20 on the opposite side from the first substrate 10, the bonding member 80 is provided in a frame shape, and, of a space between the second substrate 20 and the third substrate 30, the interior of a region surrounded by the bonding member 80 is a dry air layer or a vacuum layer. Therefore, of the space between the second substrate 20 and the third substrate 30, the interior of the region surrounded by the bonding member 80 is an enclosed space enclosed by the bonding member 80, and thus, dust is prevented from entering. In the present embodiment, the adhering of the second substrate 20 and the third substrate 30 is performed in a dry air or vacuum chamber in a clean room. In the present embodiment, the bonding member 80 contains a gap material that controls the spacing between the second substrate 20 and the third substrate 30. As a result of containing the gap material, the spacing between the second substrate 20 and the third substrate 30 can be controlled, and the bonding member 80 can be formed to be thinner. Further, an anti-reflective layer is preferably provided on a surface of the second substrate 20 facing the third substrate 30, a surface of the third substrate 30 facing the second substrate 20, and a surface of the third substrate 30 on the opposite side from the second substrate 20. In this way, unnecessary reflection can be prevented and a favorable display can be achieved.

Here, a width of the bonding member 80 is narrower than that of the sealing member 40 that adheres the first substrate 10 and the second substrate 20 to each other. For example, the width of the sealing member 40 is 0.6 mm to 1.1 mm, for example, in order to suppress the infiltration of moisture into the electro-optical layer 50, while the width of the bonding member 80 is 0.5 mm or less, for example.

In the present embodiment, the bonding member 80 extends so as to overlap with the sealing member 40 in plan view. More specifically, in plan view, the bonding member 80 extends at a position closer to the pixel region 110 than a center, in the width direction, of the sealing member 40. The bonding member 80 is made of a UV curable adhesive, for example.

In this way, in the present embodiment, the bonding member 80 that adheres the second substrate 20 and the third substrate 30 to each other is provided in the frame shape on the outer side of the pixel region 110. Therefore, the second substrate 20 and the third substrate 30 are not bonded over the entire surfaces thereof. In other words, a fixing area between the second substrate 20 and the third substrate 30 is reduced compared to a configuration of related art. Therefore, even when stress is applied to the third substrate 30 from the holding member 70 due to heat generation or the like when an image is displayed by the electro-optical device 1, such stress is unlikely to be transmitted to the second substrate 20. Thus, deformation is unlikely to occur in the second substrate 20. As a result, the spacing between the first substrate 10 and the second substrate 20 (the thickness of the electro-optical layer 50) in the pixel region 110 is unlikely to fluctuate, and a high-quality image can thus be displayed.

Further, the width of the bonding member 80 is narrower than that of the sealing member 40. In other words, while the sealing member 40 is formed with a wide width and it is thus possible to strongly suppress the infiltration of moisture that degrades the electro-optical layer 50, the width of the bonding member 80 may be formed to be narrower than the width of the sealing member 40.

Since the width of the bonding member 80 is narrower than the width of the sealing member 40, the bonding member 80 can be caused to extend at a position closer to the pixel region 110 than the center, in the width direction, of the sealing member 40 in plan view. In other words, an extending length of the bonding member 80 can be shortened. Therefore, the fixing area of the second substrate 20 and the third substrate 30 can be reduced.

First Modified Example of First Embodiment

Figure 5:
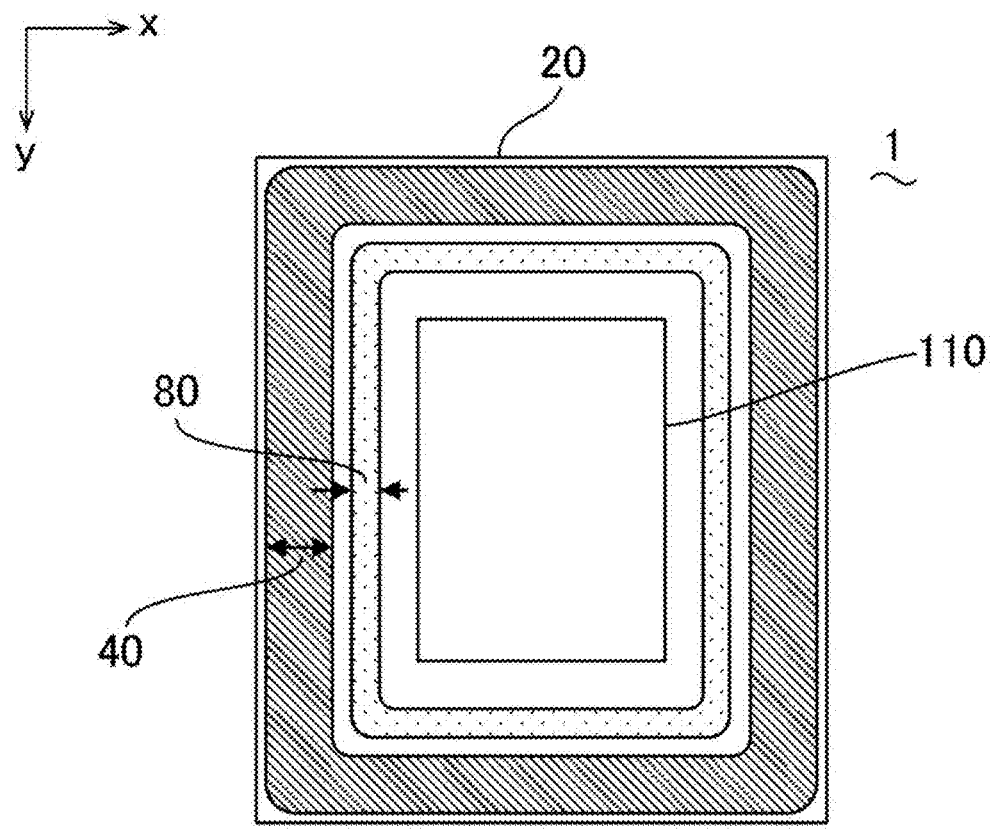
FIG. 5 is an explanatory diagram of the electro-optical device according to a first modified example of a first embodiment of the present disclosure.

FIG. 5 is an explanatory diagram of the electro-optical device 1 according to a first modified example of a first embodiment of the present disclosure. FIG. 5 schematically illustrates a planar positional relationship between the bonding member 80 and the sealing member 40. Note that the basic configuration of the present embodiment and embodiments to be described later is the same as the configuration of the first embodiment, and thus common portions are assigned the same reference signs and a description thereof will be omitted.

In the first embodiment, the bonding member 80 overlaps with the sealing member 40 in plan view, but in the present embodiment, as illustrated in FIG. 5, the bonding member 80 extends at a position separated from the sealing member 40 in plan view. More specifically, the bonding member 80 extends on the inside of the sealing member 40 at a position separated from the sealing member 40. Thus, the bonding member 80 extends in the frame shape between the sealing member 40 and the pixel region 110.

Second Modified Example of First Embodiment

Figure 6:
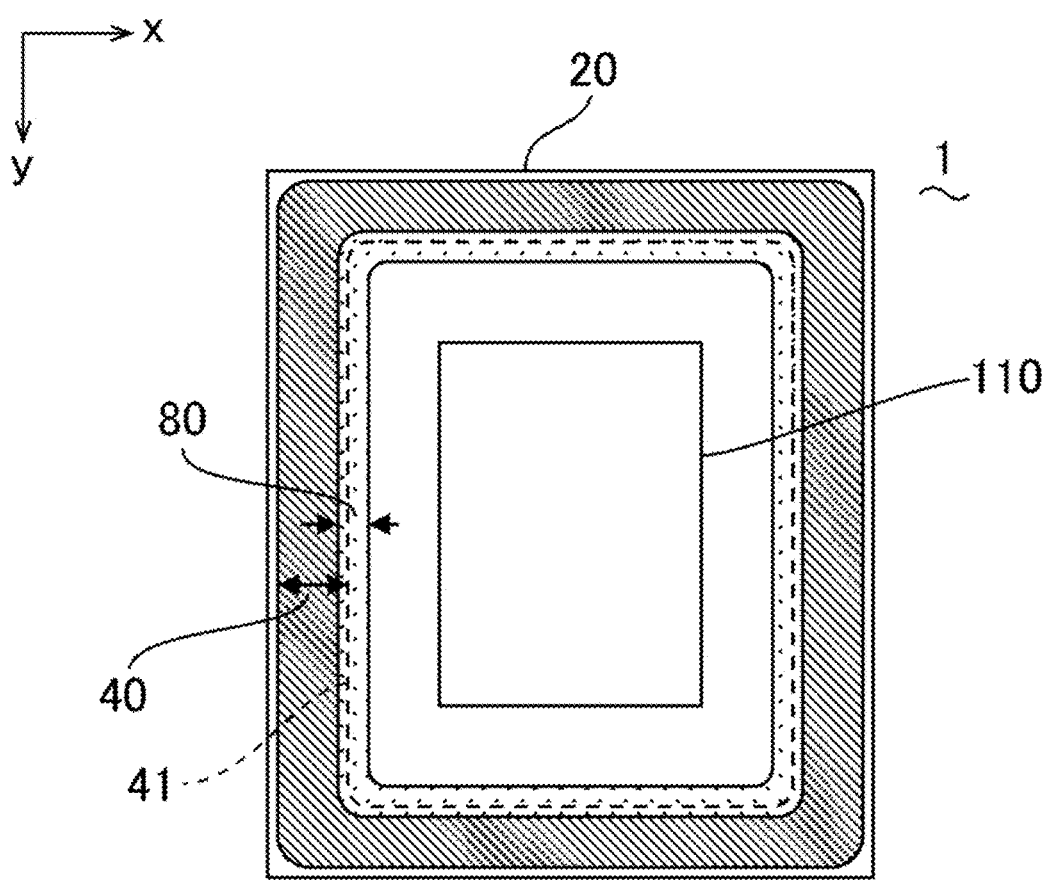
FIG. 6 is an explanatory diagram of the electro-optical device according to a second modified example of the first embodiment of the present disclosure.

FIG. 6 is an explanatory diagram of the electro-optical device 1 according to a second modified example of the first embodiment of the present disclosure. FIG. 6 schematically illustrates a planar positional relationship between the bonding member 80 and the sealing member 40. In the present embodiment, as illustrated in FIG. 6, in plan view, the bonding member 80 extends in a frame shape along the edge of the sealing member 40. More specifically, the bonding member 80 extends in the frame shape along an inner edge 41 of the sealing member 40 in plan view. In the present embodiment, the bonding member 80 extends along the inner edge 41 in a partially overlapping state with the inner edge 41 of the sealing member 40, but a mode may be adopted in which, in plan view, the bonding member 80 extends along the inner edge 41 without overlapping with the inner edge 41 of the sealing member 40.

Third Modified Example of First Embodiment

Figure 7:
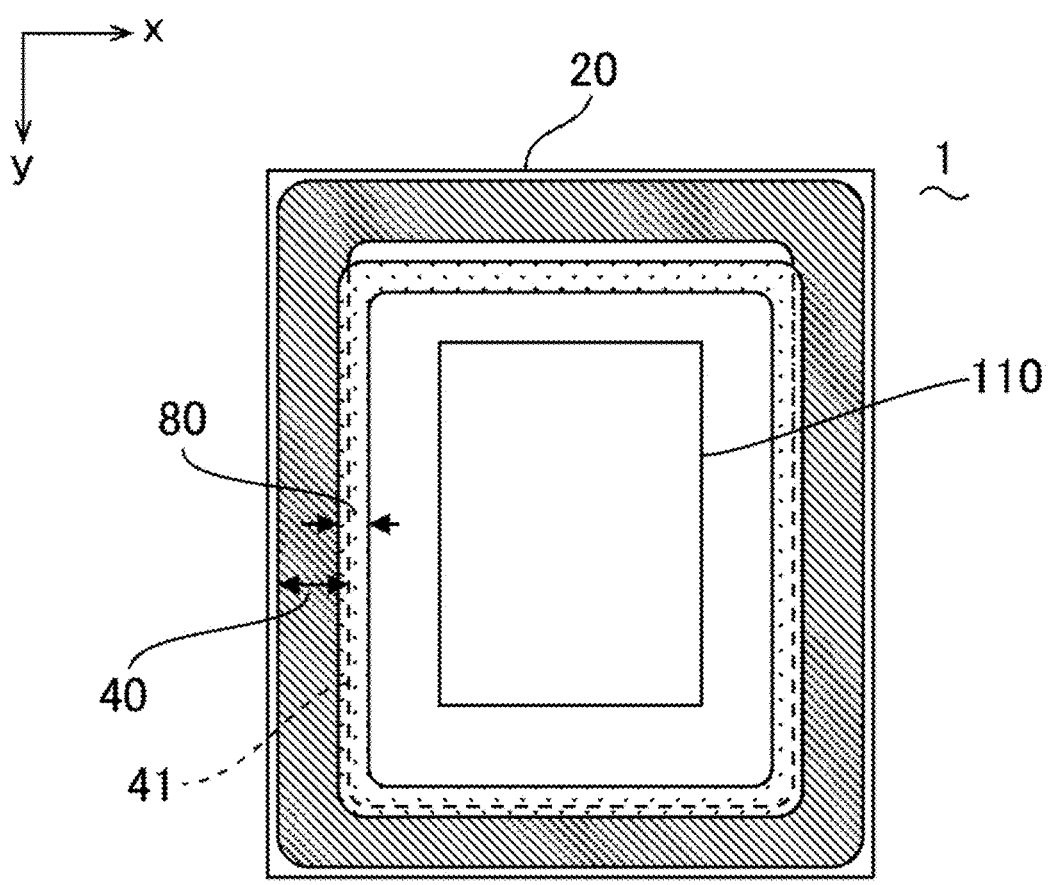
FIG. 7 is an explanatory diagram of the electro-optical device according to a third modified example of the first embodiment of the present disclosure.

FIG. 7 is an explanatory diagram of the electro-optical device 1 according to a third modified example of the first embodiment of the present disclosure. FIG. 7 schematically illustrates a planar positional relationship between the bonding member 80 and the sealing member 40. An overlap ratio between the sealing member 40 and the bonding member 80 is preferably substantially the same on the four sides of the bonding member 80. Again, in the first embodiment, the whole of the bonding member 80 overlaps with the sealing member 40 on the four sides. In the first modified example, the whole of the bonding member 80 does not overlap with the sealing member 40 on the four sides. In the second modified example, approximately a third of the width direction of the bonding member 80 overlaps with the sealing member 40 on the four sides, for example. With such a configuration, the bonding member 80 has the same degree of overlap with the sealing member 40 on the four sides, so when the third substrate 30 and the second substrate 20 are adhered to each other, the third substrate 30 can be uniformly pressed over the substrate surface. As a result, control of the width of the bonding member 80 can be favorably maintained, and it is easy to make the width of the bonding member 80 narrower than the width of the sealing member 40.

The mode illustrated in FIG. 7 is the third modified example of the first embodiment of the present disclosure, and corresponds to a comparative example with respect to the first embodiment, the first modified example, and the second modified example. In the mode illustrated in FIG. 7, on the short side on the upper side of the drawing, the bonding member 80 is provided on the inner side of the sealing member 40, and on the other three sides, a portion of the bonding member 80 in the width direction overlaps with the sealing member 40. Thus, when the third substrate 30 is pressed in order to adhere the third substrate 30 and the second substrate 20 to each other, the load cannot be supported by the gap material of the sealing member 40 on the short side on the upper side of the drawing. Therefore, on the short side on the upper side of the drawing, since the pressure tends to be insufficient, there is a risk that the width of the bonding member 80 may be formed to be thinner than on the other three sides. Therefore, as illustrated in FIG. 3, FIG. 5, and FIG. 6, on the four sides, an entire base of the bonding member 80 is preferably in the same state.

Fourth Modified Example of First Embodiment

Figure 8:
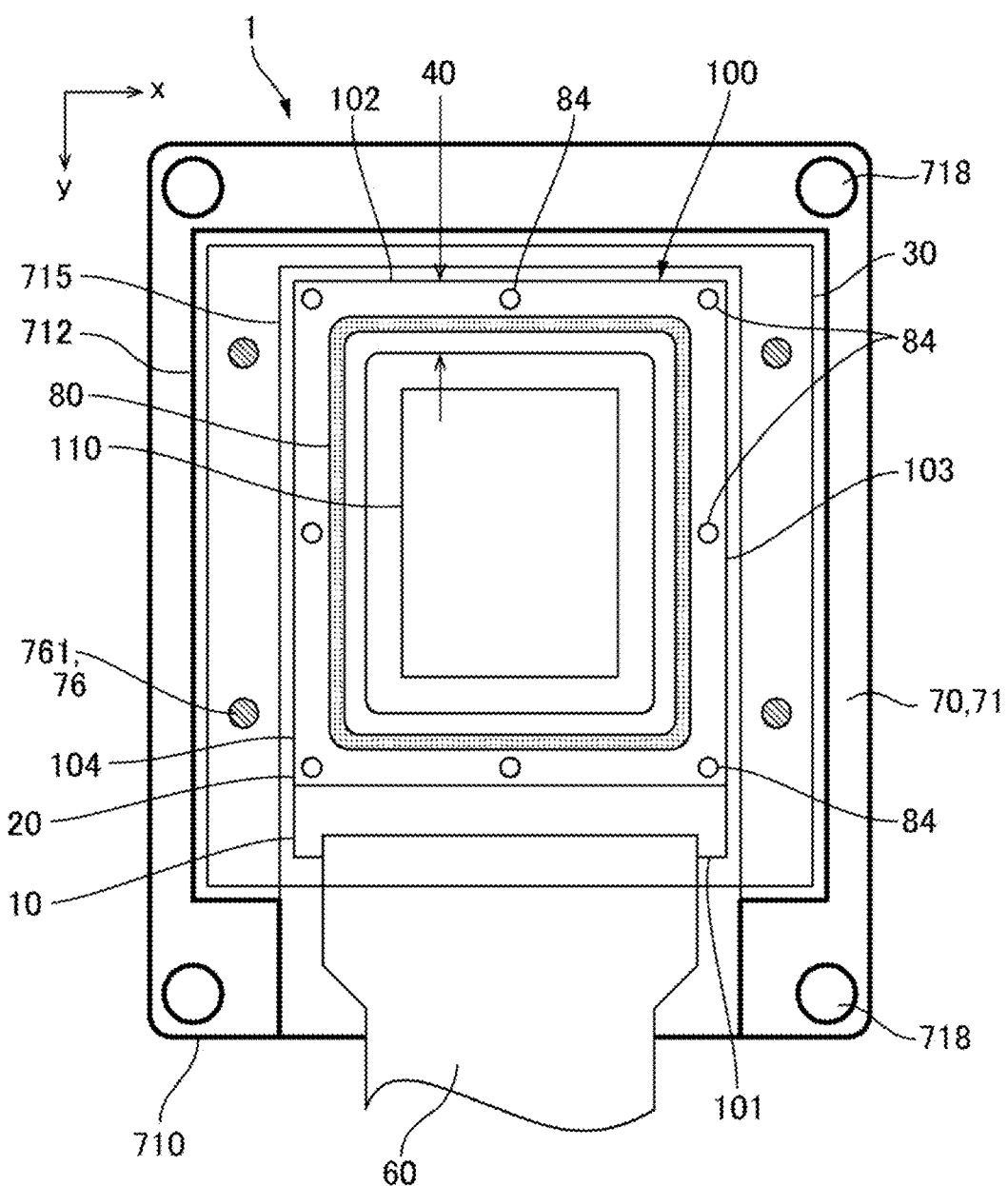
FIG. 8 is an explanatory diagram of the electro-optical device according to a fourth modified example of the first embodiment of the present disclosure.

FIG. 8 is an explanatory diagram of the electro-optical device 1 according to a fourth modified example of the first embodiment of the present disclosure. FIG. 8 schematically illustrates a planar positional relationship between the bonding member 80 and bonding portions 84. As illustrated in FIG. 8, in the present embodiment also, in a similar manner to the first embodiment, the third substrate 30 is adhered to the second substrate 20 by the bonding member 80 having the narrower width than that of the sealing member 40.

Furthermore, in the present embodiment, the dot-shaped bonding portions 84 that adhere the second substrate 20 and the third substrate 30 to each other are provided in positions separated from the bonding member 80 in plan view, and the bonding portions 84 overlap with the sealing member 40 in plan view. In the present embodiment, the bonding portions 84 are provided at a plurality of locations on the outside of the bonding member 80 so as to be symmetrical with respect to the pixel region 110. In other words, the bonding portions 84 are provided between the bonding member 80 and the end portions of the second substrate 20. In the present embodiment, the bonding portions 84 are provided in four locations corresponding to the four corners of the second substrate 20, and in four locations corresponding to the respective centers of the four sides of the second substrate 20.

Therefore, even when the width of the bonding member 80 is reduced, adhesive strength between the second substrate 20 and the third substrate 30 can be improved by the bonding portions 84. In particular, because the bonding portions 84 are provided at positions separated from the bonding member 80, even if a load is applied to the end portion of the third substrate 30 and a force is applied to diagonally peel the third substrate 30 away from the second substrate 20, such a force can be effectively resisted. Further, when the bonding member 80 is provided, the bonding portion 84 is a portion at which the adhesive is provided in the dot shape. The form of the bonding portion 84 is not limited to the dot shape, and may be a short line segment shape, for example. The adhesive strength between the second substrate 20 and the third substrate 30 can also be adjusted by adjusting the number and the length of the bonding portions 84. Because the bonding portions 84 are disposed symmetrically with respect to the pixel region 110, stress acting on the second substrate 20 from the third substrate 30 is kept symmetrical with respect to the pixel region 110. Therefore, a sense of incongruity arising from display unevenness due to stress that has not been eliminated is reduced.

Fifth Modified Example of First Embodiment

Figure 9:
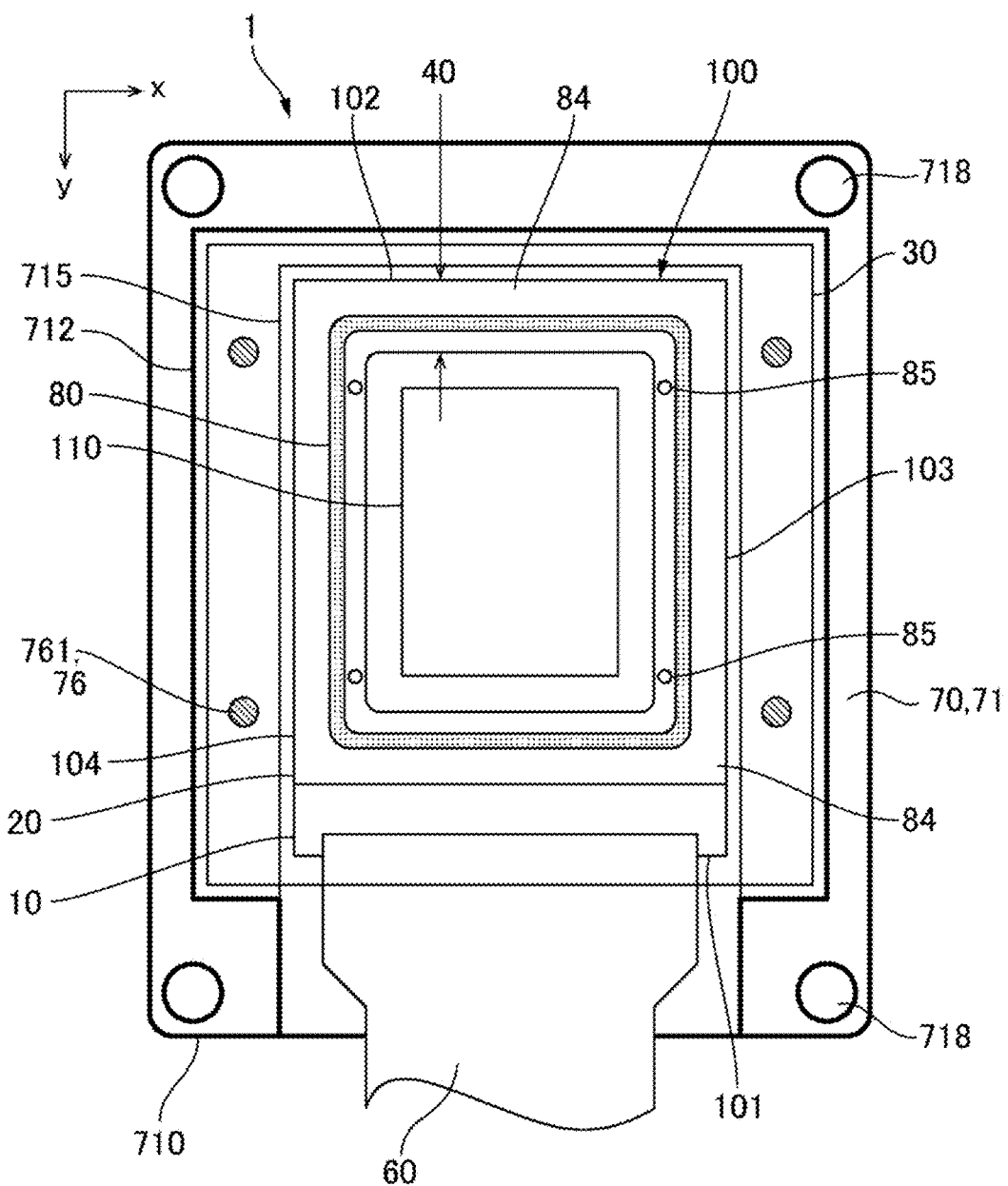
FIG. 9 is an explanatory diagram of the electro-optical device according to a fifth modified example of the first embodiment of the present disclosure.

FIG. 9 is an explanatory diagram of the electro-optical device 1 according to a fifth modified example of the first embodiment of the present disclosure. FIG. 9 schematically illustrates a planar positional relationship between the bonding member 80 and bonding portions 85. As illustrated in FIG. 9, in the present embodiment also, in a similar manner to the first embodiment, the third substrate 30 is adhered to the second substrate 20 by the bonding member 80 having the narrower width than that of the sealing member 40.

Furthermore, in the present embodiment, the dot-shaped bonding portions 85 that adhere the second substrate 20 and the third substrate 30 to each other are provided in positions separated from the bonding member 80 in plan view, and the bonding portions 85 overlap with the sealing member 40 in plan view. In the present embodiment, the bonding portions 85 are provided at a plurality of locations on the inner side of the bonding member 80. In other words, the bonding portions 85 are provided between the bonding member 80 and the pixel region 110 so as to be symmetrical with respect to the pixel region 110. In the present embodiment, the bonding portions 85 are provided at four locations corresponding to the four corners of the second substrate 20.

Therefore, even when the width of the bonding member 80 is narrowed, the adhesive strength between the second substrate 20 and the third substrate 30 can be improved by the bonding portions 85. In particular, because the bonding portions 85 are provided at positions separated from the adhesive member 80, even if a load is applied to the end portion of the third substrate 30 and a force is applied to diagonally peel the third substrate 30 away from the second substrate 20, such a force can be effectively resisted. Further, when the bonding member 80 is provided, the bonding portion 85 is a portion where the adhesive is provided in the dot shape. Therefore, even when the bonding portions 85 are added, it is possible to suppress a deterioration in productivity. Furthermore, because the bonding portions 85 are provided symmetrically with respect to the pixel region 110, even if stress caused by the bonding portions 85 acts on the second substrate 20, the stress on the second substrate 20 is applied in a uniform manner. Therefore, an uncomfortable feeling of display unevenness due to stress that has not been eliminated is reduced.

Second Embodiment

Figure 10:
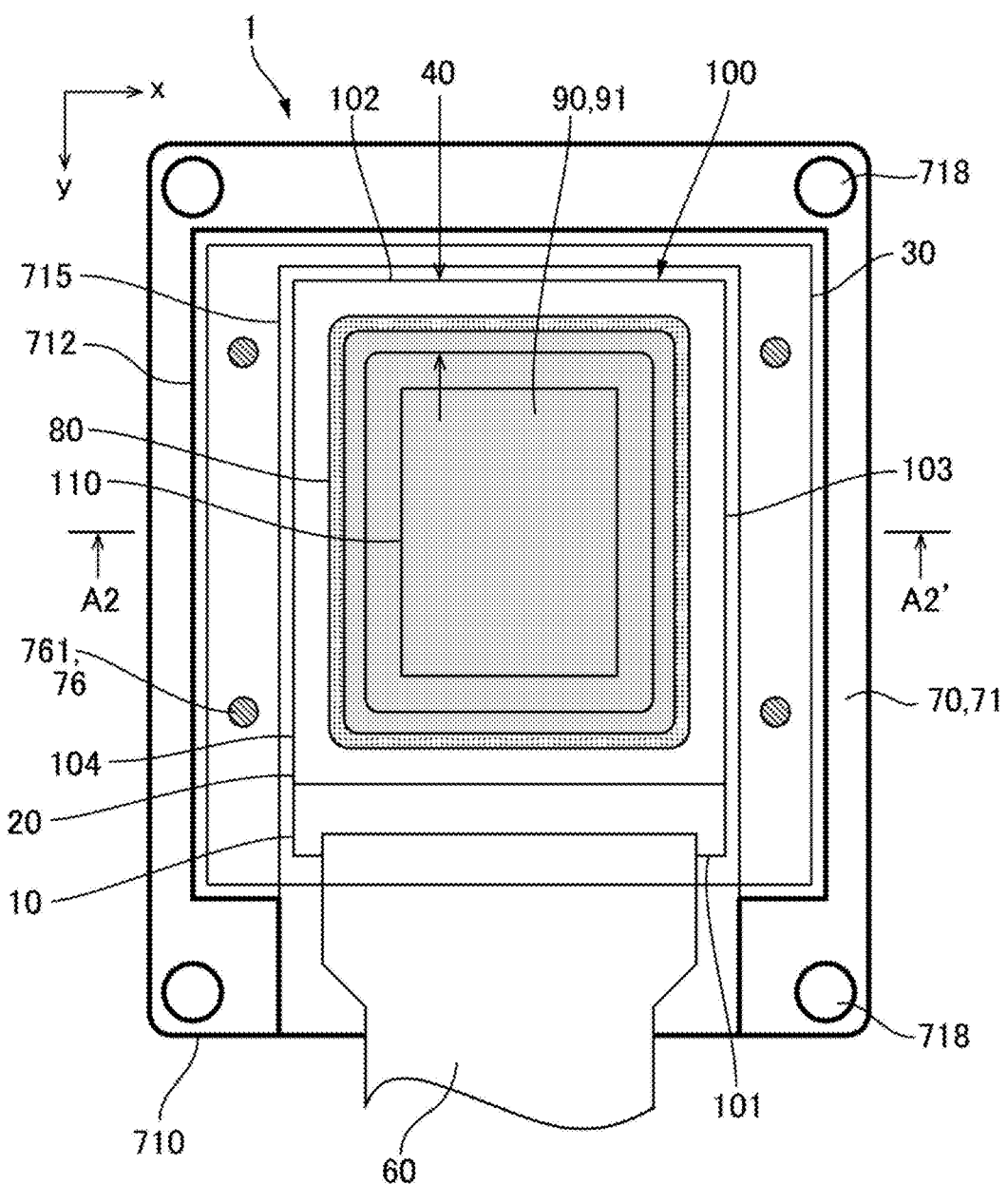
FIG. 10 is an explanatory diagram schematically illustrating a planar configuration of the electro-optical device according to a second embodiment of the present disclosure.
Figure 11:
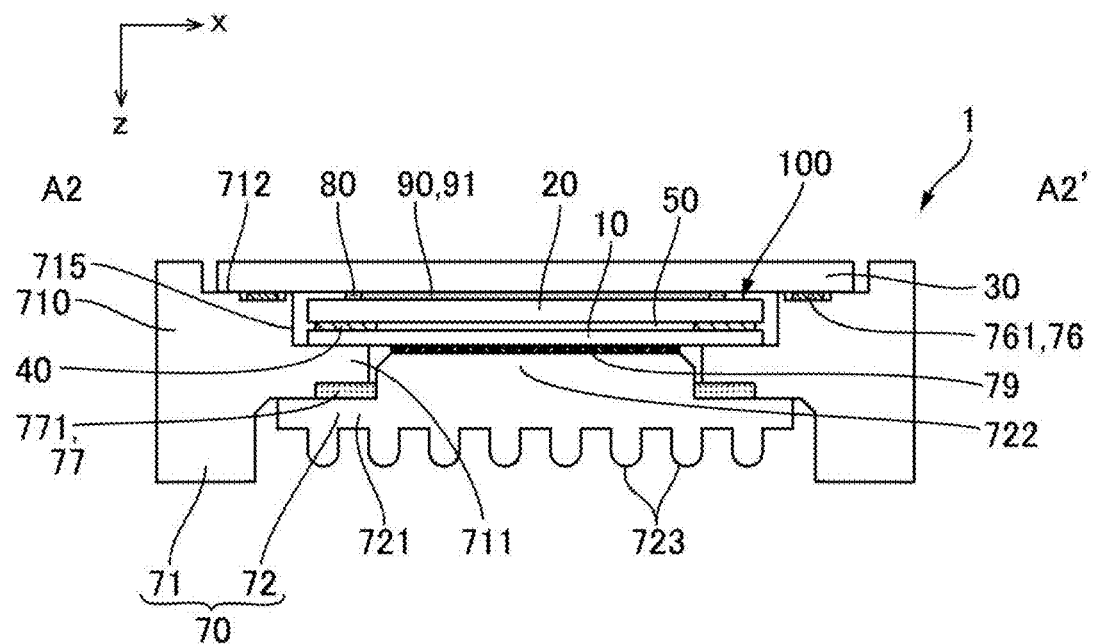
FIG. 11 is an explanatory diagram schematically illustrating a cross-section A2-A2' of the electro-optical device illustrated in FIG. 10.

FIG. 10 is an explanatory diagram schematically illustrating a planar configuration of the electro-optical device 1 according to a second embodiment of the present disclosure. FIG. 11 is an explanatory diagram schematically illustrating a cross-section A2-A2' of the electro-optical device 1 illustrated in FIG. 10. As illustrated in FIG. 10 and FIG. 11, in the present embodiment also, in a similar manner to the first embodiment, the third substrate 30 is adhered to the second substrate 20 by the bonding member 80 having the narrower width than that of the sealing member 40.

In the present embodiment, a filling material 90 is provided on the inner side of the bonding member 80 between the second substrate 20 and the third substrate 30. Here, the filling material 90 is an adhesive layer 91 having adhesiveness to the second substrate 20 and the third substrate 30. Therefore, the second substrate 20 and the third substrate 30 are adhered to each other by the bonding member 80 and the adhesive layer 91. In the present embodiment, the bonding member 80 contains a gap material that controls the spacing between the second substrate 20 and the third substrate 30. With respect to the spacing between the second 20 and third substrate 30, so that the filling material 90 can be appropriately developed, the bonding member 80 contains the gap material with an outer diameter of 2 μm to 10 μm, for example, and the spacing between the second substrate 20 and the third substrate 30 is controlled to be 2 μm to 10 μm, for example.

Further, the adhesive layer 91 has the same refractive index as the second substrate 20 and the third substrate 30. Refraction or reflection can therefore be suppressed on the surface of the second substrate 20 facing the third substrate 30, and the surface of the third substrate 30 facing the second substrate 20. Thus, the quality of the image displayed using the electro-optical device 1 can be enhanced. In other words, the anti-reflective layer provided on the surface of the second substrate 20 facing the third substrate 30 and the surface of the third substrate 30 facing the second substrate 20 in the first embodiment can be made unnecessary. Furthermore, the bonding member 80 can be a material prioritizing a coating performance and adhesive performance, for example, and the adhesive layer 91 can be a material prioritizing a refractive index matching performance, and chemical stability, for example. Therefore, there is no need for an expensive, universal adhesive in which all required properties are combined, which is necessary in a configuration of the related art.

In the present embodiment, while the bonding member 80 is the UV curable adhesive, the adhesive layer 91 is, for example, a thermosetting adhesive including an organosiloxane. In the siloxane, the —H of the (Si-0-) —H group is substituted with a hydrophobic organic group. Curing is performed for 16 hours in a temperature environment of 85° C., for example. After curing, since the adhesive layer 91 is a polymer gel in a high-humidity environment, moisture readily infiltrates. On the other hand, because the adhesive layer 91 is hydrophobic, moisture is relatively easily released by heating. Therefore, a configuration is obtained in which the width of the bonding member 80 is formed to be narrower than the width of the sealing member 40 for suppressing the infiltration of moisture, and the adhesive layer 91 facilitates the release of moisture contained in the adhesive layer 91. Because the moisture can be released from the adhesive layer 91, alteration and expansion of the adhesive layer 91 due to a chemical action of the moisture caused by irradiation of illumination light on the electro-optical device 1 is suppressed. As a result, fluctuations in the spacing between the first substrate 10 and the second substrate 20 in the pixel region 110 can be suppressed, and display unevenness can be suppressed. Incidentally, when the width of the bonding member 80 is formed to be narrower than the width of the sealing member 40, infiltration of moisture from the outside into the adhesive layer 91 can also occur. However, each time the electro-optical device 1 is used, the temperature of the electro-optical panel 100 increases due to the irradiation of the illumination light on the electro-optical device 1, and the like, and thus, moisture can be released to the outside in a relatively short period of time via the bonding member 80. Thus, the occurrence of display unevenness can be suppressed, and the deterioration in image quality can be suppressed. Further, the bonding member 80 formed with the narrower width than that of the sealing member 40 defines an application region of the adhesive layer 91, and it is thus possible to reduce the fixing area between the second substrate 20 and the third substrate 30 compared to a configuration of the related art. Therefore, the action of stress on the second substrate 20 from the third substrate 30 can be reduced, and the display unevenness is thus suppressed.

When manufacturing the electro-optical device 1 having such a configuration, the adhesive configuring the bonding member 80 is applied to one of the second substrate 20 and the third substrate 30 in the frame shape, while the adhesive configuring the adhesive layer 91 is applied on the inner side of the bonding member 80. Following that, the second substrate 20 and the third substrate 30 are overlaid with each other, and the adhesive configuring the adhesive layer 91 is developed on the inner side of the frame-shaped adhesive configuring the bonding member 80. After that, each of the adhesives is cured to form the bonding member 80 and the adhesive layer 91. In the present mode, such steps are performed in a vacuum chamber. According to such a method, since no air bubbles remain, the adhesive layer 91 can be reliably stretched to the inside of the bonding member 80 during a bonding step.

First Modified Example of Second Embodiment

Figure 12:
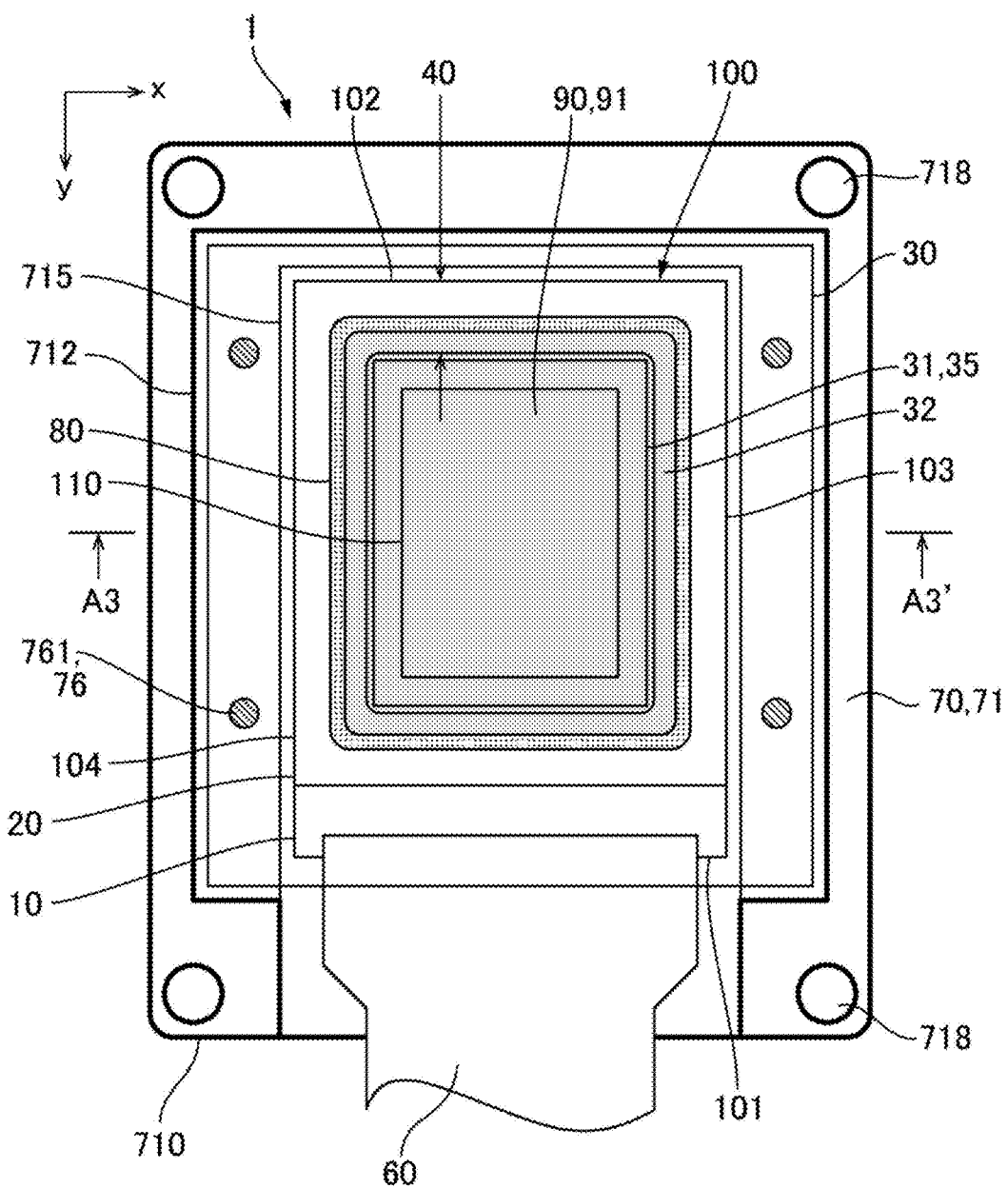
FIG. 12 is an explanatory diagram schematically illustrating a planar configuration of the electro-optical device according to a first modified example of the second embodiment of the present disclosure.
Figure 13:
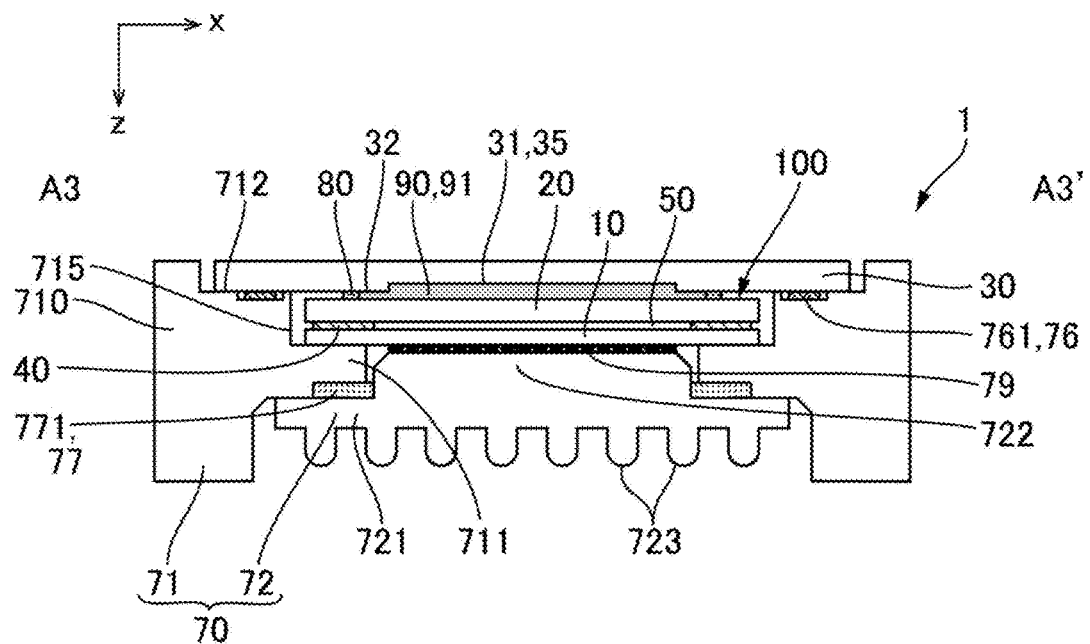
FIG. 13 is an explanatory diagram schematically illustrating a cross-section A3-A3' of the electro-optical device illustrated in FIG. 12.
Figure 14:
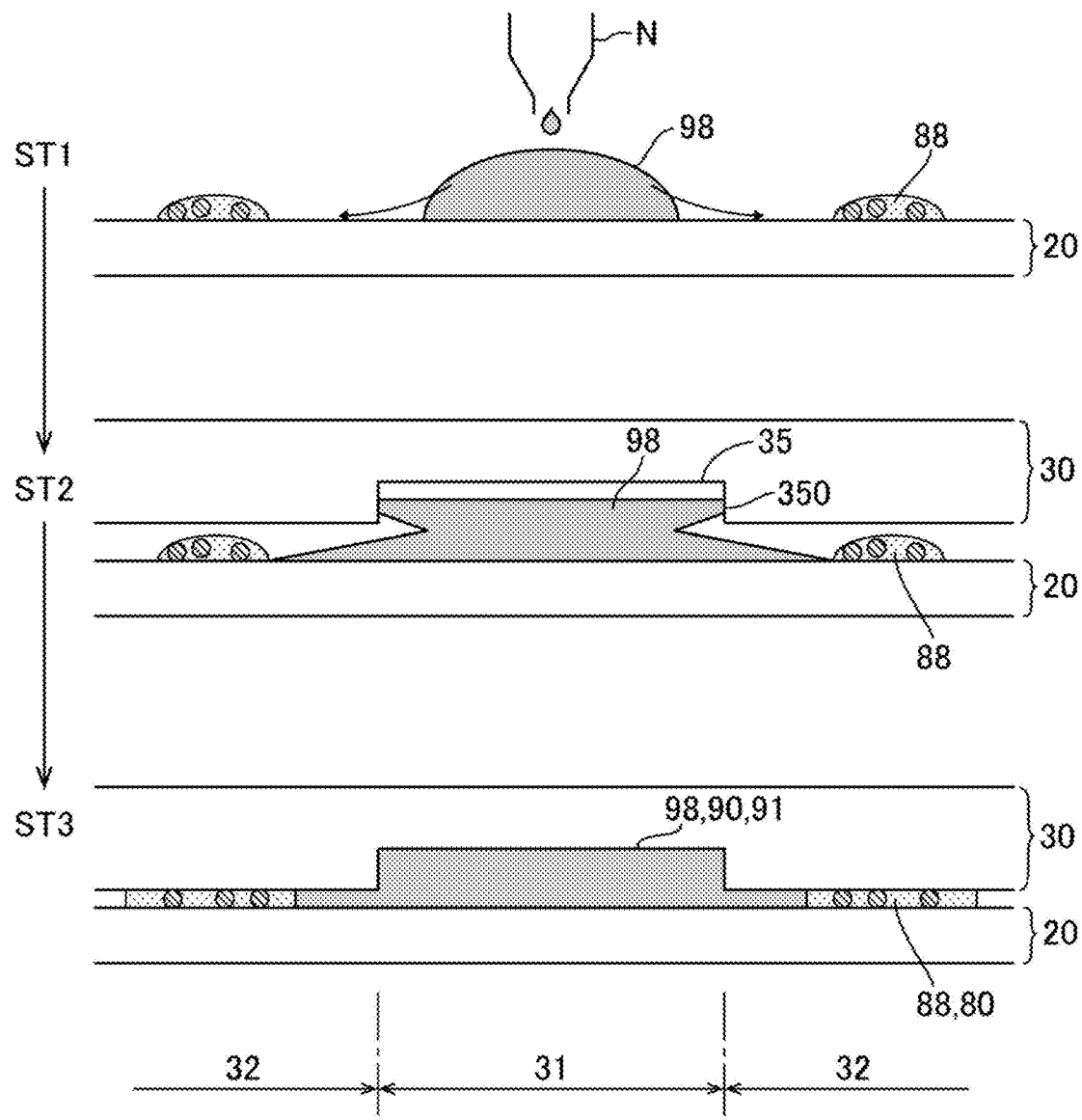
FIG. 14 is a process cross-sectional view illustrating a manufacturing method of the electro-optical device illustrated in FIG. 12.

FIG. 12 is an explanatory diagram schematically illustrating a planar configuration of the electro-optical device 1 according to a first modified example of the second embodiment of the present disclosure. FIG. 13 is an explanatory diagram schematically illustrating a cross-section A3-A3' of the electro-optical device 1 illustrated in FIG. 12. FIG. 14 is a process cross-sectional view illustrating a manufacturing method of the electro-optical device 1 illustrated in FIG. 12.

As illustrated in FIG. 12 and FIG. 13, in the present embodiment also, in a similar manner to the first embodiment, the third substrate 30 is adhered to the second substrate 20 by the bonding member 80 having the narrower width than that of the sealing member 40. In the present embodiment, the bonding member 80 contains the gap material that controls the spacing between the second substrate 20 and the third substrate 30. Further, in a similar manner to the second embodiment, the filling material 90 is provided between the second substrate 20 and the third substrate 30, on the inner side of the bonding member 80. Here, the filling material 90 is the adhesive layer 91 having adhesiveness to the second substrate 20 and the third substrate 30, and the adhesive layer 91 has the same refractive index as the second substrate 20 and the third substrate 30.

In the present embodiment, a recessed portion is provided in one of the first substrate 20 and the third substrate 30, which causes the spacing between the second substrate 20 and the third substrate 30 in a center side region 31 that includes the display region 110 on the inner side of the bonding member 80 to be wider than the spacing between the second substrate 20 and the third substrate 30 in an outside region 32 between the center side region 31 and the bonding member 80. In the present embodiment, a recessed portion 35 is formed in the center side region 31 of the third substrate 30, and the recessed portion 35 causes the spacing between the substrate 20 and the substrate 30 in the center side region 31 to be wider than the spacing between the second substrate 20 and the third substrate 30 in the outside region 32. The recessed portion 35 can be formed by etching the third substrate 30, and the depth of the recessed portion 35 is 2 μm to 10 μm, for example. The recessed portion 35 is filled with the filling material 90.

When manufacturing the electro-optical device 1 according to the present embodiment, at a first step ST1 illustrated in FIG. 14, an adhesive 88 configuring the bonding member 80 is applied in a frame shape to the second substrate 20 using a dispenser device, while an adhesive 98 configuring the adhesive layer 91 is applied on the inner side of the adhesive 88 using a nozzle N of a different dispenser device.

Next, at a second step ST2 illustrated in FIG. 14, the second substrate 20 and the third substrate 30 are overlaid with each other, and the adhesive 98 configuring the adhesive layer 91 is developed on the inner side of the frame-shaped adhesive 88 configuring the bonding member 80. When the second substrate 20 and the third substrate 30 are overlaid with each other, when the adhesive 98 comes into contact with the third substrate 30 in advance of the adhesive 88, the adhesive 98 becomes elongated due to the fluidity of the adhesive 98, and an incident may occur in which the adhesive 98 exceeds a dam formed by the adhesive 88. Thus, the recessed portion 35 is provided so that the adhesive 88 comes into contact first with the third substrate 30, and forms the dam. By providing the recessed portion 35, after being temporarily held back at a stepped portion 350, at a third step ST3 illustrated in FIG. 14, when the second substrate 20 and the third substrate 30 are overlaid as far as a predetermined spacing, the adhesive 98 is gently developed on the inner side of the adhesive 88. As a result, leakage of the adhesive 98 can be suppressed.

Following that, the adhesives 88 and 98 are cured to form the bonding member 80 and the adhesive layer 91, respectively.

Second Modified Example of Second Embodiment

Figure 15:
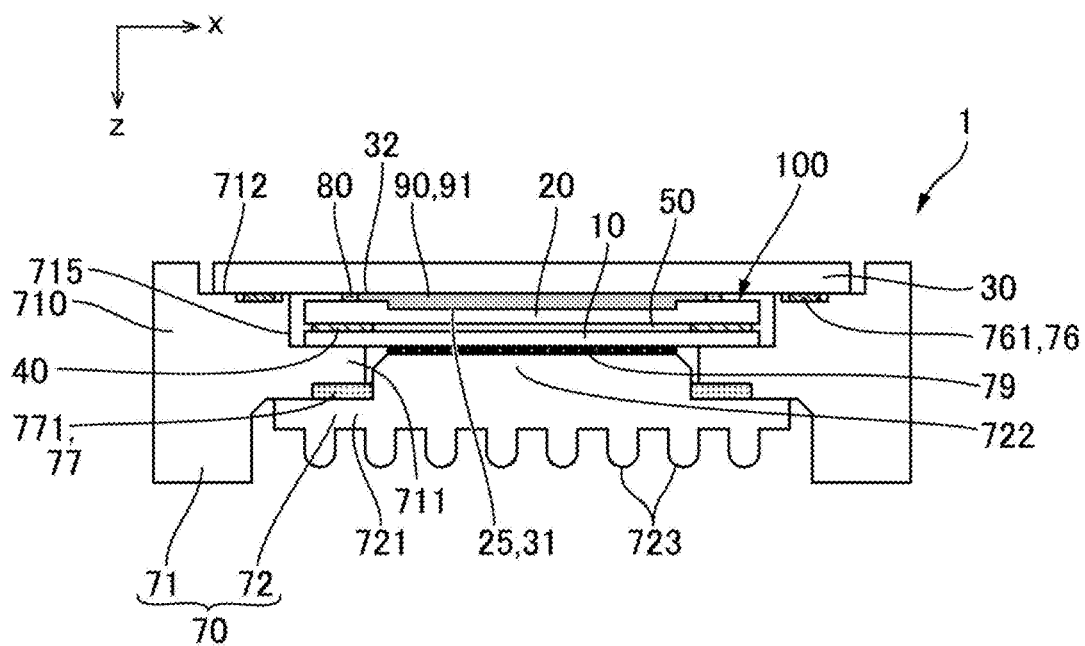
FIG. 15 is an explanatory diagram schematically illustrating a cross section of the electro-optical device according to a second modified example of the second embodiment of the present disclosure.

FIG. 15 is an explanatory diagram schematically illustrating a cross section of the electro-optical device 1 according to a second modified example of the second embodiment of the present disclosure. In the first modified example of the second embodiment, the recessed portion 35 is formed in the center side region 31 of the third substrate 30, but as illustrated in FIG. 15, a recessed portion 25 may be formed in the second substrate 20. The recessed portion 25 is filled with the filling material 90 (the adhesive layer 91).

In this case, at the first step ST1 illustrated in FIG. 14, the adhesive 88 configuring the bonding member 80 is applied to the third substrate 30 in a frame shape, while the adhesive 98 configuring the adhesive layer 91 is applied on the inner side of the adhesive 88. Subsequent steps are the same as those of the first modified example of the second embodiment. Note that the recessed portion 35 illustrated in FIG. 12 and the recessed portion 25 illustrated in FIG. 15 may both be provided.

Third Modified Example of Second Embodiment

Figure 16:
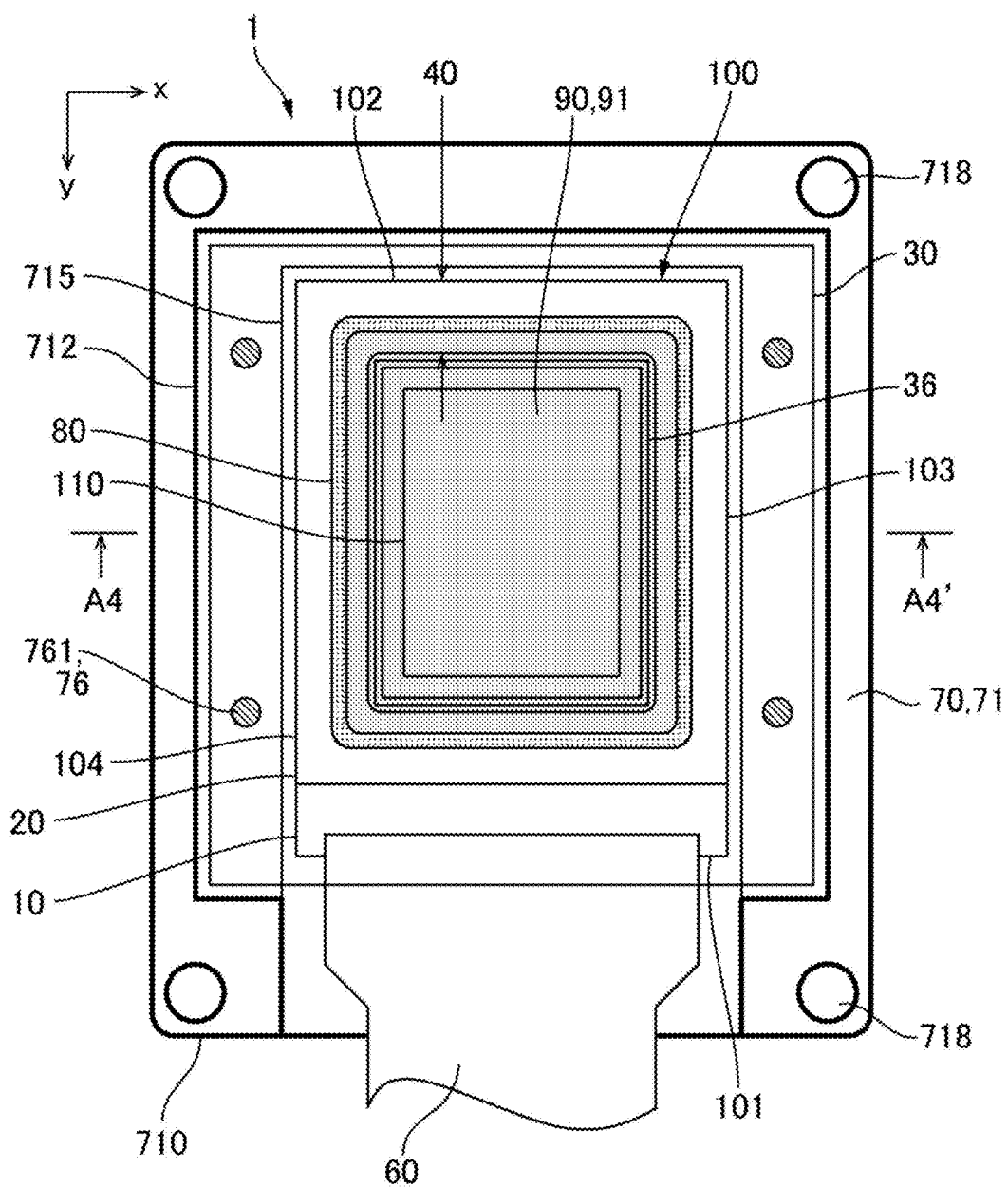
FIG. 16 is an explanatory diagram schematically illustrating a planar configuration of the electro-optical device according to a third modified example of the second embodiment of the present disclosure.
Figure 17:
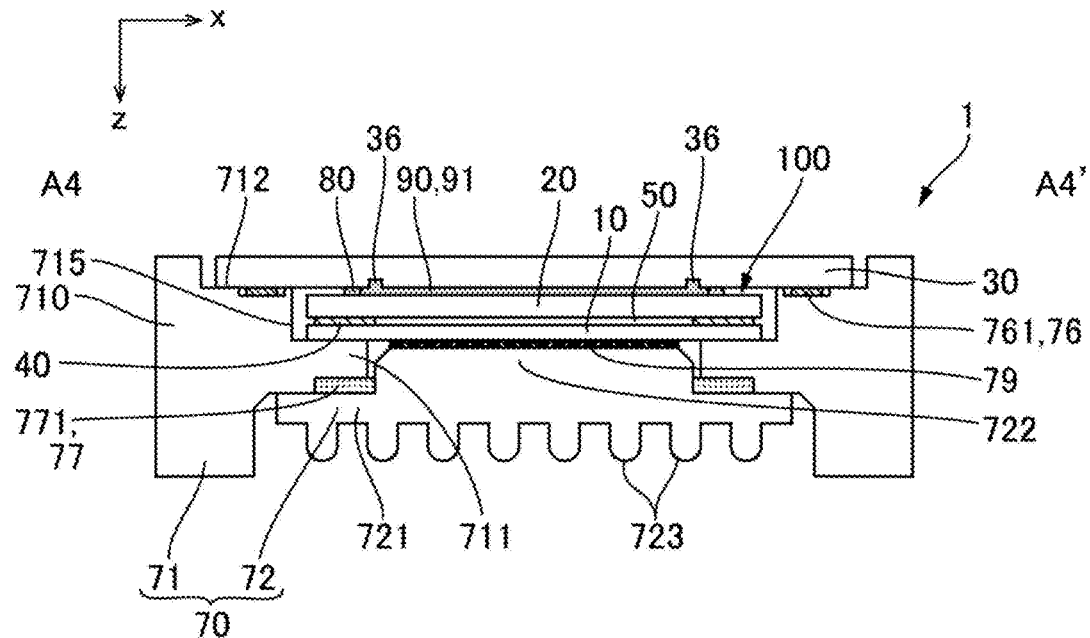
FIG. 17 is an explanatory diagram schematically illustrating a cross-section A4-A4' of the electro-optical device illustrated in FIG. 16.

FIG. 16 is an explanatory diagram schematically illustrating a planar configuration of the electro-optical device 1 according to a third modified example of the second embodiment of the present disclosure. FIG. 17 is an explanatory diagram schematically illustrating a cross-section A4-A4' of the electro-optical device 1 illustrated in FIG. 16. As illustrated in FIG. 16 and FIG. 17, in the present embodiment also, in a similar manner to the first embodiment, the third substrate 30 is bonded to the second substrate 20 by the bonding member 80 having the narrower width than that of the sealing member 40. Further, in a similar manner to the second embodiment, the filling material 90 is provided between the second substrate 20 and the third substrate 30, on the inner side of the bonding member 80. Here, the filling material 90 is the adhesive layer 91 having adhesiveness to the second substrate 20 and the third substrate 30, and the adhesive layer 91 has the same refractive index as the second substrate 20 and the third substrate 30.

In the present embodiment, a groove 36 that surrounds the pixel region 110 is provided in one of the second substrate 20 and the third substrate 30, on the inner side of the bonding member 80. Therefore, at the second step ST2 illustrated in FIG. 14, when the adhesive 98 is developed, the adhesive 98 is temporarily held back by the groove 36 of the third substrate 30, and after that, is gently developed on the inner side of the adhesive 88, at the third step ST3 illustrated in FIG. 14. Note that the groove 36 is filled with the filling material 90. In such an mode, since the recessed portion having a large area is not formed, processability is improved compared to the second modified example or the third modified example of the second embodiment.

Fourth Modified Example of Second Embodiment

Although not illustrated, the groove 36 illustrated in FIG. 16 and FIG. 17 may be formed in the second substrate 20. In this case, at the first step ST1 illustrated in FIG. 14, the adhesive 88 configuring the bonding member 80 is applied to the third substrate 30 in a frame shape, while the adhesive 98 configuring the adhesive layer 91 is applied on the inner side of the adhesive 88. Subsequent steps are the same as those of the first modified example of the second embodiment. Further, the groove 36 may be provided in both the second substrate 20 and the third substrate 30.

Other Modified Examples of Second Embodiment

In the second embodiment, the filling material 90 is added to the electro-optical device 1 according to the first embodiment, but the filling material 90 may be added to the electro-optical device 1 according to the first to fifth modified examples of the first embodiment. Note that, in the electro-optical device 1 according to the fifth modified example of the first embodiment, since the bonding portions 85 are provided on the inner side of the bonding member 80, the bonding portions 85 are embedded in the adhesive layer 91. In such a case also, when the adhesive strength of the adhesive layer 91 is weak, the peeling off of the third substrate 30 from the second substrate 20 can be suppressed by the adhesive force between the second substrate 20 and the third substrate 30 generated by the bonding portions 85.

Third Embodiment

Figure 18:
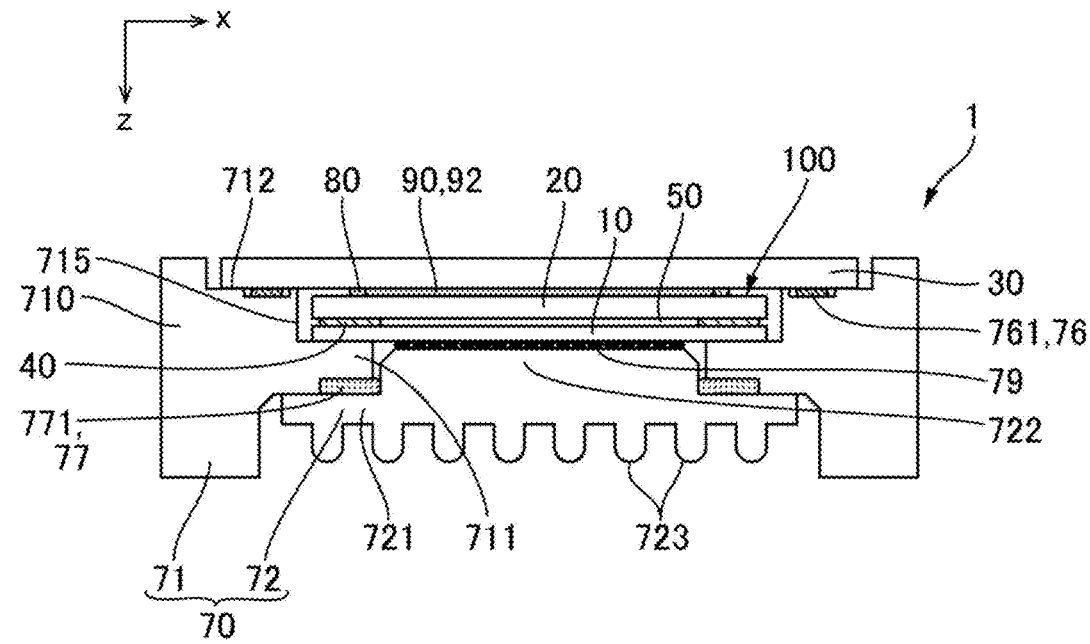
FIG. 18 is an explanatory diagram schematically illustrating a cross section of the electro-optical device according to a third embodiment of the present disclosure.

FIG. 18 is an explanatory diagram schematically illustrating a cross section of the electro-optical device 1 according to a third embodiment of the present disclosure. As illustrated in FIG. 18, in the present embodiment also, in a similar manner to the first embodiment, the third substrate 30 is bonded to the second substrate 20 by the bonding member 80 having the narrower width than that of the sealing member 40. Further, in a similar manner to the second embodiment, the filling material 90 is provided between the second substrate 20 and the third substrate 30, on the inner side of the bonding member 80. Here, the filling material 90 is a liquid material 92 that does not have adhesiveness to the second substrate 20 and the third substrate 30. Further, the liquid material 92 has the same refractive index as the second substrate 20 and the third substrate 30. Refraction or reflection can therefore be suppressed on the surface of the second substrate 20 facing the third substrate 30, and the surface of the third substrate 30 facing the second substrate 20. Further, the filling material 90 remains as the liquid material 92 that does not have adhesiveness to the second substrate 20 and the third substrate 30, and thus is not cured. Therefore, a situation does not arise in which the second substrate 20 is deformed by changes due to expansion when curing is performed.

When manufacturing the electro-optical device 1 according to the present embodiment, the adhesive configuring the bonding member 80 is applied in the frame shape to one of the second 20 and the third substrate 30, while the adhesive configuring the liquid material 92 is applied on the inner side thereof. Following that, the second substrate 20 and the third substrate 30 are overlaid with each other, and the liquid material 92 is developed on the inner side of the frame-shaped adhesive configuring the bonding member 80. The adhesive is then cured to form the bonding member 80.

Modified Example of Third Embodiment

In the present embodiment also, the configuration described in each of the modified examples 2 to 4 of the second embodiment, and in the other modified examples may be adopted. For example, a configuration may be adopted in which the recessed portions 25 and 35 described in the modified examples of the second embodiment are provided, or a structure in which the groove 36 is provided.

Other Embodiments

In the above-described embodiments, the electro-optical device 1 is the reflection-type liquid crystal device. However, the present disclosure may be applied to a case in which the electro-optical device 1 is a transmissive liquid crystal device, or to a case in which the electro-optical device 1 is an organic electroluminescent device. When the electro-optical device 1 is the transmissive liquid crystal device, a dust-proof glass is adhered to each of the first substrate 10 and the second substrate 20. In this case, a structure in which at least one of the dust-proof glass adhered to the first substrate 10 and the dust-proof glass adhered to the second substrate 20 is a "third substrate", and a structure is adopted in which the dust-proof glass is adhered using a bonding member having a narrow width.

Installation Example on Electronic Apparatus

Figure 19:
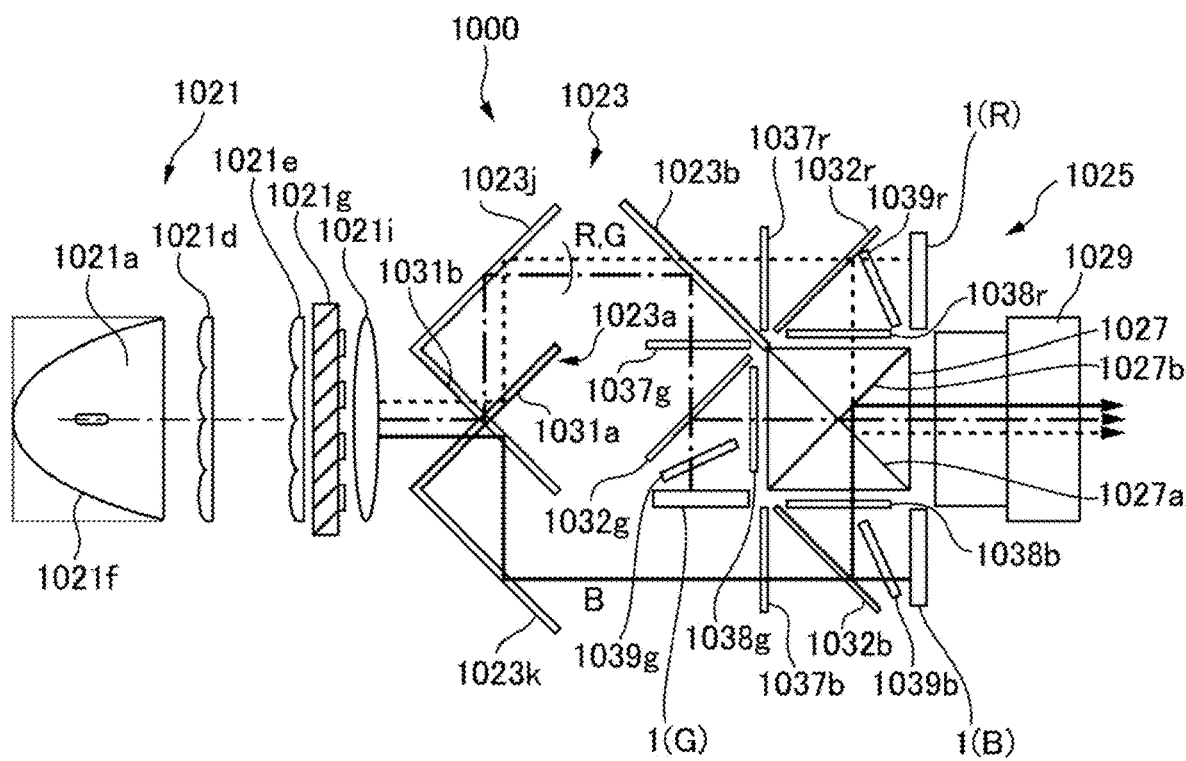
FIG. 19 is an explanatory diagram of a projection-type display device using a reflection-type electro-optical device.

With reference to FIG. 19, a projection-type display device is described as an electronic apparatus to which the present disclosure is applied. FIG. 19 is an explanatory diagram of a projection-type display device using the reflection-type electro-optical device 1. The electro-optical device 1 is the electro-optical device according to the above-described embodiments and modified examples. A projection-type display device 1000 illustrated in FIG. 19 includes a light source unit 1021 that generates light source light, a color separation light guide optical system 1023 that separates the light source light emitted from the light source unit 1021 into three colors of red, green, and blue, and a light modulation unit 1025 that receives the light source light of each color emitted from the color separation light guide optical system 1023. The projection-type display apparatus 1000 also includes a cross dichroic prism 1027 (synthetic optical system) that synthesizes image light of each of the colors emitted from the light modulation unit 1025 and a projection optical system 1029, which is a projection optical system that projects the image light that has passed through the cross dichroic prism 1027 onto a screen (not illustrated).

In the projection-type display apparatus 1000 configured in such a manner, the light source unit 1021 includes a light source 1021a, a pair of fly-eye optical systems 1021d and 1021e, a polarization conversion member 1021g, and a superimposing lens 1021i. In the present embodiment, the light source unit 1021 is provided with a reflector 1021f formed by a paraboloidal surface, and emits parallel light. The fly-eye optical systems 1021d and 1021e each include a plurality of element lenses arranged in a matrix pattern in a plane orthogonal to the optical axis of the system, and the element lenses divide the light source light and individually condense and disperse the divided light. The polarization conversion member 1021g converts the light source light emitted from the fly-eye optical system 1021e into only a p-polarized light component parallel to the sheet surface of FIG. 22, for example, and supplies the converted light to an optical system downstream on an optical path. The superimposing lens 1021i causes the light source light that has passed through the polarization conversion member 1021g to be converged as a whole, and thus, superimposed illumination can be performed in a uniform manner on each of a plurality of the electro-optical 1 devices 1 (R), (G), and (B) provided in the light-modulating portion 1025.

The color separation light guide optical system 1023 includes a cross dichroic mirror 1023a, a dichroic mirror 1023b, and reflection mirrors 1023j and 1023k. In the color separation light guide optical system 1023, substantially white source light from the light source unit 1021 is incident on the cross dichroic mirror 1023a. Red light (R) reflected by a first dichroic mirror 1031a that is one of components configuring the cross dichroic mirror 1023a is reflected by the reflection mirror 1023j, is then transmitted through the dichroic mirror 1023b, and is incident, maintaining the p-polarized state, on the electro-optical device 1 (R) for red color (R), via an incident side polarization plate 1037r, a wire grid polarization plate 1032r, and an optical compensation plate 1039r.

Green light (G) reflected by the first dichroic mirror 1031a is reflected by the reflection mirror 1023j, is then reflected by the dichroic mirror 1023b, and is incident, maintaining the p-polarized state, on the electro-optical device (G) for green color (G), via an incident side polarization plate 1037g, a wire grid polarization plate 1032g, and an optical compensation plate 1039g.

In contrast, blue light (B) reflected by a second dichroic mirror 1031b that is another component configuring the cross dichroic mirror 1023a is reflected by the reflection mirror 1023k, and is then incident, maintaining the p-polarized state, on the electro-optical device 1 (B) for blue color (B), via an incident side polarization plate 1037b, a wire grid polarization plate 1032b, and an optical compensation plate 1039b. Note that the optical compensation plates 1039r, 1039g, and 1039b adjust polarization states of light incident on and emitted from the electro-optical devices 1 (R), (G) and (B), and thus optically compensate properties of a liquid crystal layer.

In the projection-type display device 1000 configured in such a manner, the light of the three colors that are incident after passing through the optical compensation plates 1039r, 1039g, and 1039b are each modulated in the electro-optical devices 1 (R), (G) and (B). At this time, s-polarized components of the light emitted from the electro-optical devices (R), (G), and (B) are respectively reflected by the wire grid polarization plates 1032r, 1032g, and 1032b, and are then incident on the cross dichroic prism 1027 via emission side polarization plates 1038r, 1038g, and 1038b. A first dielectric multilayer film 1027a and a second dielectric multilayer film 1027b formed so as to intersect each other in a cross shape are formed on the cross dichroic prism 1027. The first dielectric multilayer film 1027a reflects the red light (R) and the second dielectric multilayer film 1027b reflects the blue light (B). Thus, light of the three colors is synthesized in the cross dichroic prism 1027, and then emitted to the projection optical system 1029. Then, the projection optical system 1029 projects the color image light synthesized in the cross dichroic prism 1027 onto the screen (not illustrated), at a desired magnification.

Other Projection-Type Display Devices

Note that the projection-type display device may include a configuration in which LED light sources or the like that emit light of each color are used as the light source unit, and the light of each color emitted from the LED light sources is supplied to another liquid crystal device.

Other Electronic Apparatuses

The electronic apparatus provided with the electro-optical device 1 to which the present disclosure is applied is not limited to the projection-type display device of the above-described embodiments. Examples of the electronic apparatus may include a projection-type head up display (HUD), a direct-view-type head mounted display (HMD), a personal computer, a digital still camera, and a liquid crystal television.

What is claimed is:

1. An electro-optical device comprising:
an electro-optical panel including a first substrate, a second substrate facing the first substrate, and a sealing member having a frame shape and provided between the first substrate and the second substrate;
a third substrate adhered to one of the first substrate and the second substrate;
a holding member including:
a first housing portion housing the electro-optical panel, the first housing portion including a support plate portion that supports the electro-optical panel; and
a second housing portion housing the third substrate on an outer side of the first housing portion; and
a bonding member having a frame shape and provided between the third substrate and the one of the substrates, the bonding member having a narrower width than the sealing member, wherein
the bonding member is provided in a region overlapping with the support plate portion of the first housing portion in a plan view.

2. The electro-optical device according to claim 1, wherein
the bonding member overlaps with the sealing member in plan view.

3. The electro-optical device according to claim 1, wherein
the bonding member is separated from the sealing member in plan view.

4. The electro-optical device according to claim 1, wherein
the bonding member is provided along an inner edge of the sealing member in plan view.

5. The electro-optical device according to claim 1, wherein
a bonding portion having a dot shape or a line segment shape is provided in a position separated from the bonding member and overlapping with the sealing member in plan view.

6. The electro-optical device according to claim 1, wherein
a filling material is provided on an inner side of the bonding member.

7. The electro-optical device according to claim 6, wherein the filling material has adhesiveness to the third substrate and the one of the substrates.

8. The electro-optical device according to claim 6, wherein the filling material is a liquid material.

9. The electro-optical device according to claim 6, wherein a recessed portion is provided in at least one of the third substrate and the one of the substrates such that a spacing between the third substrate and the one of the substrates in a center side region including a pixel region and positioned on the inner side of the bonding member, is wider than a spacing between the third substrate and the one of the substrates in an outside region between the center side region and the bonding member, and the recessed portion is filled with the filling material.

10. The electro-optical device according to claim 6, wherein at least one of the third substrate and the one of the substrates is provided with a groove that surrounds a pixel region on the inner side of the bonding member in plan view, and the groove is filled with the filling material.

11. The electro-optical device according to claim 1, wherein the third substrate is fixed to the holding member by an adhesive, and the electro-optical panel is fixed to the holding member via the third substrate.

12. An electronic apparatus comprising:
the electro-optical device according to claim 1.

* * * * *